(12) United States Patent
Okada

(10) Patent No.: US 8,915,328 B2
(45) Date of Patent: Dec. 23, 2014

(54) CONSTRUCTION MACHINE

(75) Inventor: Koji Okada, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 80 days.

(21) Appl. No.: 13/882,364

(22) PCT Filed: Oct. 14, 2011

(86) PCT No.: PCT/JP2011/005774
§ 371 (c)(1),
(2), (4) Date: Apr. 29, 2013

(87) PCT Pub. No.: WO2012/056643
PCT Pub. Date: May 3, 2012

(65) Prior Publication Data
US 2013/0213726 A1    Aug. 22, 2013

(30) Foreign Application Priority Data

Oct. 29, 2010  (JP) ................................ 2010-243879

(51) Int. Cl.
| B60K 13/04 | (2006.01) |
| F01N 3/00 | (2006.01) |
| E02F 9/08 | (2006.01) |
| F01N 3/20 | (2006.01) |
| F01N 13/18 | (2010.01) |
| F01N 13/00 | (2010.01) |
| B01D 53/94 | (2006.01) |

(52) U.S. Cl.
CPC ............ *E02F 9/0866* (2013.01); *F01N 3/2066* (2013.01); *F01N 13/1805* (2013.01); *E02F 9/0833* (2013.01); *F01N 13/009* (2013.01); *B01D 53/9431* (2013.01); *F01N 2590/08* (2013.01); *F01N 2590/10* (2013.01); *Y02T 10/24* (2013.01)

USPC ............................................ 180/309; 60/295

(58) Field of Classification Search
USPC ................... 180/309, 89.2, 311; 60/295, 297; 248/637, 678, 676, 677, 671
See application file for complete search history.

(56) References Cited

U.S. PATENT DOCUMENTS

| 7,517,380 B2 * | 4/2009 | Grimm et al. ................. 180/89.2 |
| 7,806,214 B2 * | 10/2010 | Tsukui et al. ............... 180/89.17 |

(Continued)

FOREIGN PATENT DOCUMENTS

| JP | 2009 79422 | 4/2009 |
| JP | 2009 103016 | 5/2009 |

OTHER PUBLICATIONS

International Search Report Issued Jan. 17, 2012 in PCT/JP11/05774 Filed Oct. 14, 2011.

*Primary Examiner* — J. Allen Shriver, II
*Assistant Examiner* — James M Dolak
(74) *Attorney, Agent, or Firm* — Oblon, Spivak, McClelland, Maier & Neustadt, L.L.P.

(57) ABSTRACT

A construction machine including: a frame; an engine on a frame; a hydraulic pump; a guard panel disposed on the frame to surround an engine room and including a maintenance port for the hydraulic pump; an exhaust-gas-purification device inside the engine room; and a support member to support an exhaust-gas-aftertreatment device including the exhaust-gas-purification device just above the hydraulic pump. The support member includes a first portion to support the exhaust-gas-purification device and a second portion to support a NOx-reducing catalyst at a position closer to the maintenance port than the exhaust-gas-purification device. The catalyst supporting portion supports the NOx-reducing catalyst at a position higher than the exhaust-gas-purification device so as to form, over the hydraulic pump, a maintenance space having an upper end higher than an upper end of a space formed under the first portion and the exhaust-gas-purification device.

10 Claims, 7 Drawing Sheets

(56) References Cited

U.S. PATENT DOCUMENTS

| | | |
|---|---|---|
| 7,967,094 B2 * | 6/2011 | Matsushita et al. ........ 180/89.17 |
| 8,276,370 B2 * | 10/2012 | Kamiya et al. .................. 60/295 |
| 8,365,518 B2 * | 2/2013 | Ezawa et al. .................... 60/297 |
| 8,403,099 B2 * | 3/2013 | Yokota .......................... 180/309 |
| 8,407,991 B2 * | 4/2013 | Yokota ............................ 60/297 |
| 8,459,014 B2 * | 6/2013 | Kamiya et al. .................. 60/295 |
| 8,516,807 B2 * | 8/2013 | Kosaka et al. .................. 60/297 |
| 8,549,847 B2 * | 10/2013 | Kamiya et al. .................. 60/299 |
| 8,573,646 B2 * | 11/2013 | Kamiya ........................ 180/89.2 |
| 8,708,087 B2 * | 4/2014 | Kashu et al. .................. 180/296 |
| 8,820,691 B2 * | 9/2014 | Bednarz et al. .......... 248/295.11 |
| 2010/0192551 A1 | 8/2010 | Yokota |
| 2010/0218488 A1 | 9/2010 | Yokota |

\* cited by examiner

LEFT ←→ RIGHT

FIG.9A
FIG.9B
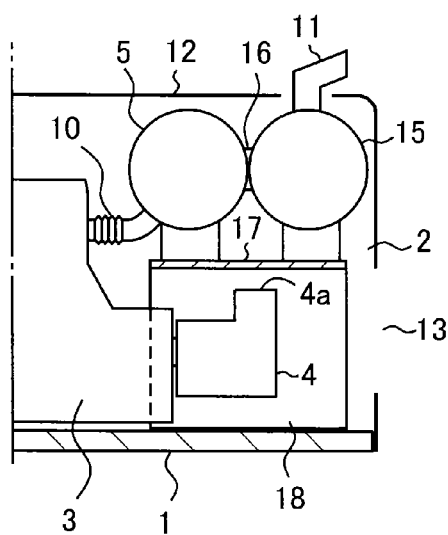
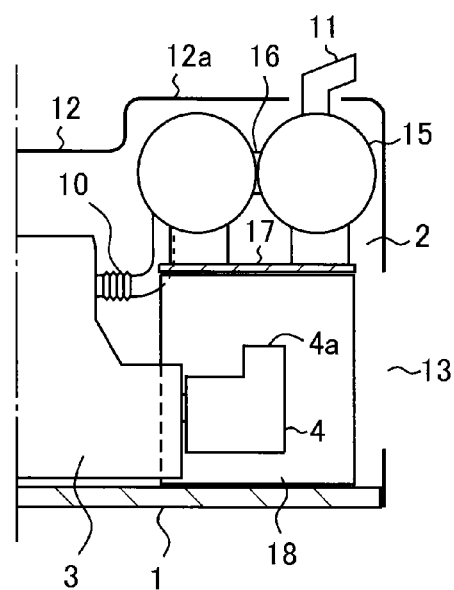

CONSTRUCTION MACHINE

TECHNICAL FIELD

The present invention relates to a construction machine, such as a hydraulic excavator, equipped with an engine exhaust system comprising an exhaust-gas-aftertreatment device.

BACKGROUND ART

Background art related to the present invention will be described by taking a hydraulic excavator as an example.

FIG. 7 illustrates an upper slewing body mounted on a lower propelling body in a hydraulic excavator. The upper slewing body comprises: an upper frame 1; an engine room 2; an engine 3 provided inside the engine room 2; a hydraulic pump 4; an exhaust-gas-purification device (DPF: Diesel Particulate Filter, also called "exhaust gas filter" or "soot purifying device") 5 as one type of exhaust-gas-aftertreatment device; a heat exchanger 6; a cooling fan 7; a table 9 for supporting the exhaust-gas-purification device 5; and a guard panel 12.

The upper frame 1 has a front end (in FIG. 7, a left end) to which a non-illustrated work attachment comprising a boom, an arm and a bucket is attached, and a rear end on which the engine room 2 is formed. The engine 3 is provided inside the engine room 2 in a posture of extending in a right-left direction of the engine room 2. The hydraulic pump 4 is disposed on one side of the engine 3 in the right-left direction, e.g., on a right side (in FIG. 7, an upper side) of the engine 3, and connected to an output shaft of the engine 3. The exhaust-gas-purification device 5 is installed so as to extend in a front-rear direction across and over the hydraulic pump 4. The heat exchanger 6 and the cooling fan 7 are installed on a left side of the engine 3.

The exhaust-gas-purification device 5 is connected to the engine 3 via a flexible exhaust pipe 10, to remove harmful substances, particularly, PM (Particulate Matter) such as soot, contained in exhaust gas of the engine 3 to purify the exhaust gas, discharging the purified exhaust gas to outside via an exhaust stack 11.

The table 9 is provided above the upper frame 1 via a support leg 8, and the exhaust-gas-purification device 5 is placed on the table 9.

The guard panel 12 is provided on the upper frame 1 to define the engine room 2, as illustrated in FIG. 8, and the engine 3 and the hydraulic pump 4 are housed inside the guard panel 12. The guard panel 12 has a maintenance port 13 which is opened in a right sidewall thereof to allow maintenance of a hydraulic pump 4 (including a regulator 4a provided on an upper surface of the pump) to be performed from outside therethrough.

In the engine room 2, there is provided a partition wall 14 so as to shut off between the exhaust-gas-purification device 5 and the hydraulic pump 4. The partition wall 14 defines, on a right side thereof and just above the hydraulic pump 4, a maintenance space for allowing maintenance of the hydraulic pump 4 to be performed through the maintenance port 13.

However, in the case of a need for enhancing exhaust gas purification performance, there is possibility of providing a NOx-reducing catalyst 15 for reducing NOx contained in exhaust gas, one type of exhaust-gas-aftertreatment device, as additional equipment in side-by-side relation with the exhaust-gas-purification device 5, as described in the following Patent Document 1, which may exert an influence on the maintenance of the hydraulic pump 4.

More specifically, in the case of adding the NOx-reducing catalyst 15 to the structure illustrated in FIG. 8, it is conceivable that the NOx-reducing catalyst 15 is installed on a right side of (a side closer to the maintenance port 13 with respect to) the exhaust-gas-purification device 5 in side-by-side relation with the exhaust-gas-purification device 5, and connected to the exhaust-gas-purification device 5 via a connection pipe 16, as illustrated in FIG. 9A. In this case, there is provided a table 17 which is so long in the right-left direction as to extend across the exhaust-gas-purification device 5 and the NOx-reducing catalyst 15 while being supported by a support leg 18. This table 17 additionally serves as a fire-protecting partition wall. In some cases, each of the table 17 and the support leg 18 is separately divided into two separate portions: one for the exhaust-gas-purification device and the other for the NOx-reducing catalyst.

In this arrangement, i.e., in an arrangement where the exhaust-gas-purification device 5 and the NOx-reducing catalyst 15 are arranged side-by-side on the same horizontal plane at respective relatively low positions as illustrated in FIG. 9A, the table 17 supporting them closes up an upper space of the hydraulic pump 4, thereby preventing maintenance requiring access to the hydraulic pump 4 from thereabove, particularly, inspection or replacement of the regulator 4a of the hydraulic pump 4, from being performed, unless the table 17 and the NOx-reducing catalyst 15 are removed.

The maintenance space just above the hydraulic pump 4 can be formed, for example, by raising an overall position of the exhaust-gas-purification device 5 and the NOx-reducing catalyst 15, as illustrated in FIG. 9B. This arrangement, however, requires an increase in length of the flexible exhaust pipe 10 for interconnecting the engine 3 and the exhaust-gas-purification device 5, involving an increase in cost. Besides, raising the position of the exhaust-gas-purification device 5 gives rise to a need for forming a portion (in the illustrated embodiment, a right end) 12a of the top wall of the guard panel 12 corresponding to an installation position of the exhaust-gas-purification device 5 and the NOx-reducing catalyst 15, into a shape protruding upwardly, as illustrated in FIG. 9B. The protruding portion 12a, requiring a large size in a width direction (right-left direction) for covering both of the exhaust-gas-purification device 5 and the NOx-reducing catalyst 15, significantly narrows operator's rearward visibility (exactly, visibility in an obliquely rearward direction). The NOx-reducing catalyst 15 is equipment to be additionally provided according to the need for enhancing exhaust gas purification performance; however, even in the case of not providing the NOx-reducing catalyst 15, there also exists a need for improving maintainability of the hydraulic pump 4 while ensuring an installation area for the NOx-reducing catalyst 15.

LIST OF PRIOR ART DOCUMENTS

Patent Documents

Patent Document 1: JP 2009-79422A

SUMMARY OF THE INVENTION

It is an object of the present invention to provide a construction machine capable of ensuring a maintenance space above a hydraulic pump while allowing a NOx-reducing catalyst to be installed, not involving a significant increase in cost.

Provided by the present invention is a construction machine which comprises: a frame; an engine installed on the frame; a hydraulic pump installed on the frame in side-byside relation with the engine along an axial direction of the engine to be driven by the engine; a guard panel disposed on the frame so as to surround an engine room in which the engine and the hydraulic pump is accommodated, the guard panel having a maintenance port which is an opening for allowing maintenance of the hydraulic pump to be performed from the outside; an exhaust-gas-purification device provided in the engine room and connected to the engine via an exhaust pipe to remove particulate matter contained in exhaust gas from the engine; and a support member adapted to support an exhaust-gas-aftertreatment device including the exhaust-gas-purification device, inside the engine room at a position just above the hydraulic pump, wherein the support member has: a purification device supporting portion to support the exhaust-gas-purification device; and a catalyst supporting portion to support, at a position closer to the maintenance port than the exhaust-gas-purification device, a NOx-reducing catalyst which is equipment to be additionally included in the gas aftertreatment device so as to reduce NOx contained in the exhaust gas, the catalyst supporting portion being adapted to support the NOx-reducing catalyst at a position higher than the exhaust-gas-purification device supported by the purification device supporting portion, so as to form, just above the hydraulic pump, a maintenance space having an upper end at a position higher than an upper end of a space formed just below the purification device supporting portion and the exhaust-gas-purification device supported by the purification device supporting portion.

BRIEF DESCRIPTION OF THE DRAWINGS

FIG. 9A is a sectional back view illustrating an arrangement where, in addition to an exhaust-gas-purification device illustrated in FIG. 8, a NOx-reducing catalyst is installed in side-by-side relation with the exhaust-gas-purification device at a height position equal to that of the exhaust-gas-purification device, and FIG. 9B is a sectional back view illustrating an arrangement where the exhaust-gas-purification device and the NOx-reducing catalyst are installed in side-by-side relation at a position higher than the position illustrated in FIG. 9A.

DESCRIPTION OF EMBODIMENTS

With reference to FIGS. 1 to 6, first and second embodiments of the present invention will be described.

Figure 7:
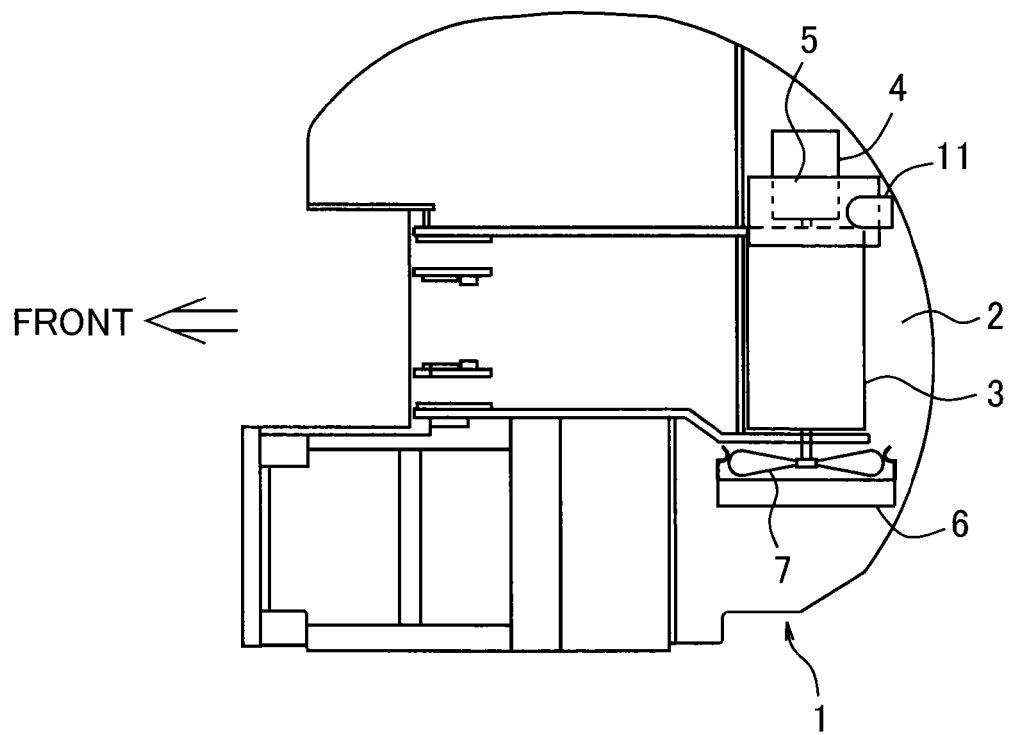
FIG. 7 is a top plan view illustrating an upper frame and an equipment layout of a hydraulic excavator which is an example of a construction machine to which the present invention can be applied.
Figure 8:
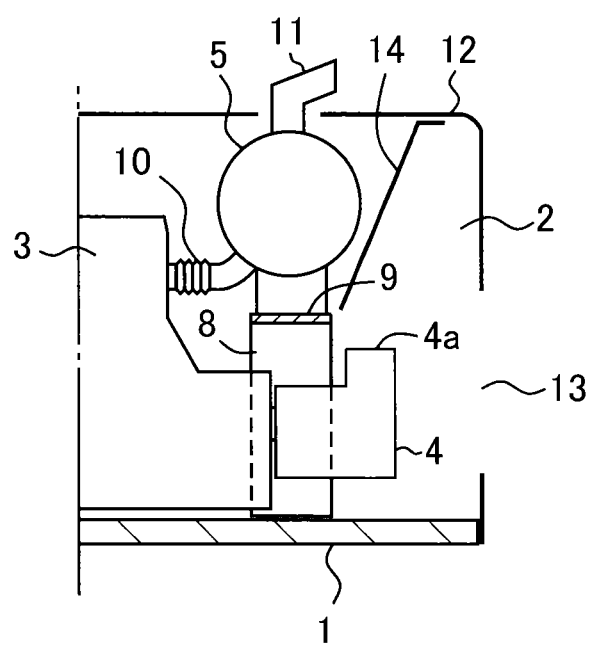
FIG. 8 is a sectional back view illustrating a substantial part of a conventional construction machine.

The embodiment of the present invention presents a construction machine comprising the aforementioned upper slewing body illustrated in FIG. 7. Specifically, the upper slewing body in the embodiment also comprises: an upper frame 1; an engine room 2; an engine 3 provided inside the engine room 2; a hydraulic pump 4; an exhaust-gas-purification device 5 as one type of exhaust-gas-aftertreatment device; a heat exchanger 6; and a cooling fan 7. The upper frame 1 has a front end (in FIG. 7, a left end) to which a non-illustrated work attachment comprising a boom, an arm and a bucket is attached, and a rear end on which the engine room 2 is formed. The engine 3 is provided in the engine room 2 in a posture of extending in a right-left direction of the engine room 2. The hydraulic pump 4 is disposed on one side of the engine 3 in the right-left direction, e.g., on a right side (in FIG. 7, an upper side) of the engine 3, and connected to an output shaft of the engine 3. The exhaust-gas-purification device 5 is installed so as to extend in a front-rear direction across and over the hydraulic pump 4. The heat exchanger 6 and the cooling fan 7 are installed on a left side of the engine 3.

The exhaust-gas-purification device 5 is connected to the engine 3 via a flexible exhaust pipe 10, to remove harmful substances, particularly, PM (Particulate Matter) such as soot, contained in exhaust gas of the engine 3 to purify the exhaust gas, and to discharge the purified exhaust gas to outside via an exhaust stack 11. The exhaust-gas-purification device 5 is adapted to be supported at a position above the hydraulic pump 4 by an aftermentioned support member. Furthermore, in the case of a requirement for enhancing exhaust gas purification performance, provided is a NOx-reducing catalyst 15 for reducing NOx contained in exhaust gas, one type of exhaust-gas-aftertreatment device, as additional equipment.

Next will be described features of the first embodiment of the present invention with reference to FIGS. 1 to 5.

The engine room 2 is defined by a guard panel 12 surrounding it. The guard panel 12 is provided on the upper frame 1, and the engine 3 and the hydraulic pump 4 are accommodated inside the guard panel 12. The guard panel 12 includes a top wall, right and left sidewalls and a back wall, wherein the right sidewalls has a maintenance port 13 opened therein to allow maintenance of a hydraulic pump 4 (including a regulator 4a provided on an upper surface of the pump) to be performed from outside through the maintenance port 13.

Figure 3:
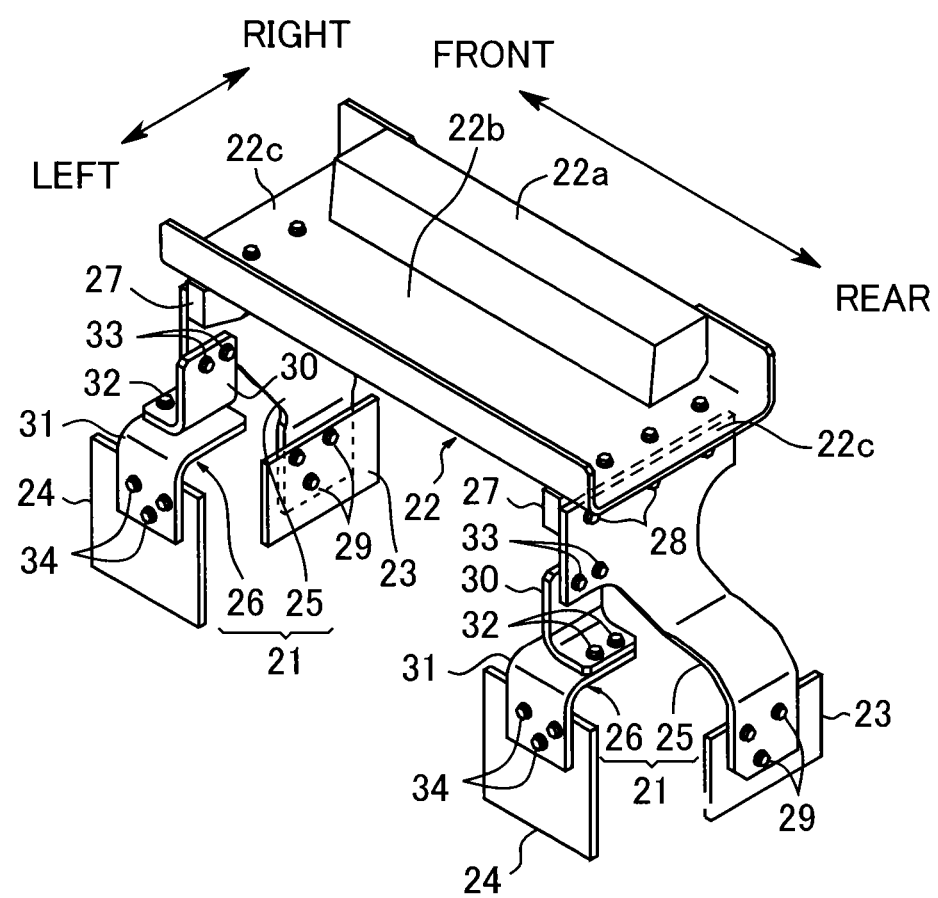
FIG. 3 is a perspective view of a table and a support leg included in the construction machine.
Figure 4:
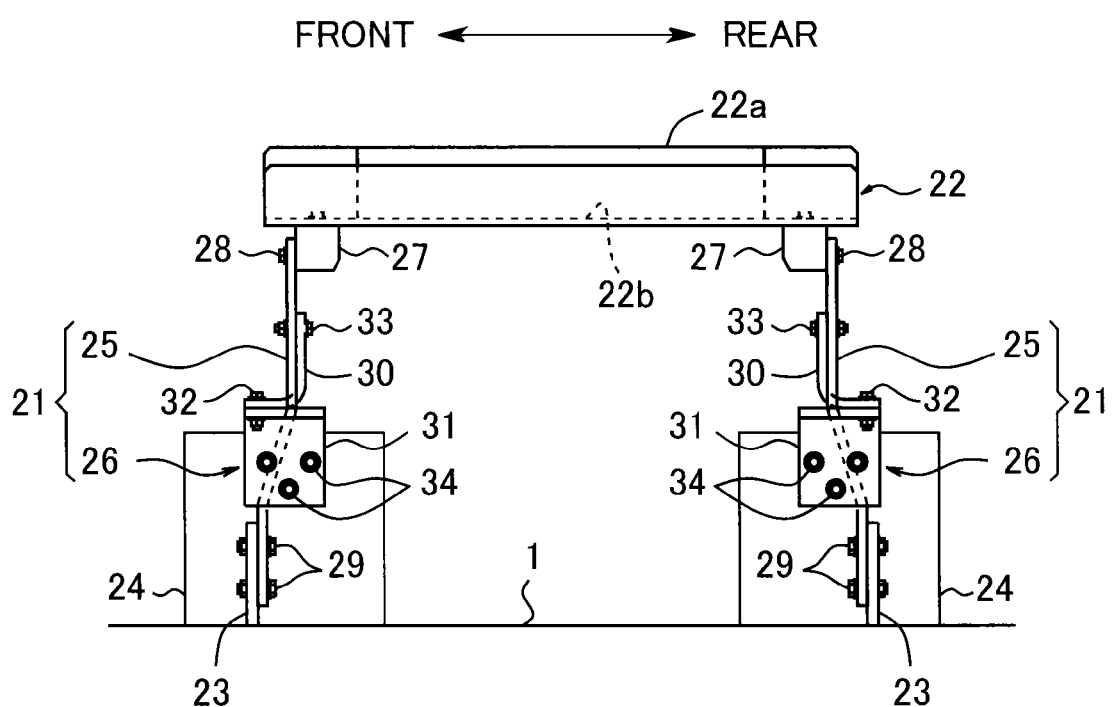
FIG. 4 is a side view of the table and the support leg.
Figure 5:
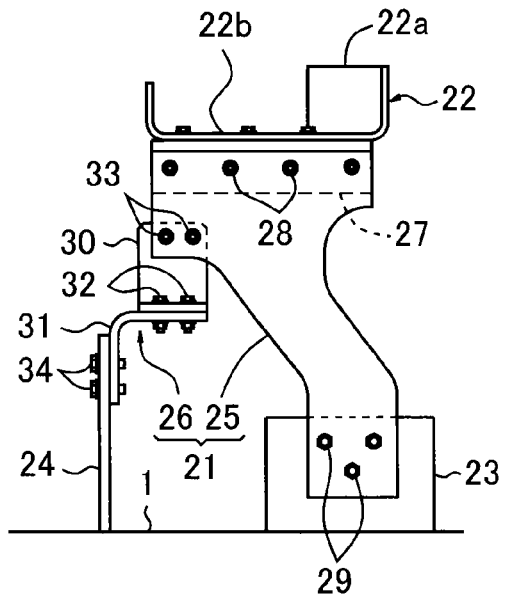
FIG. 5 is a back view of the table and the support leg.

The support member is to support both of the exhaust-gas-purification device 5 and the NOx-reducing catalyst 15 which can be additionally provided, including a pair of support legs 21 arranged along a front-rear direction and a table 22 supported at a position above the hydraulic pump 4 by the support legs 21, as illustrated in FIGS. 3 to 5. The table 22 has a purification device supporting portion 22b on which the exhaust-gas-purification device 5 is to be placed and a catalyst supporting portion 22a on which the NOx-reducing catalyst 15 can be placed.

The two supporting portions 22b, 22a are arranged side-by-side in a right-left direction of the upper slewing body, wherein: the purification device supporting portion 22b is located on a relatively left side, and the catalyst supporting portion 22a is located on a relatively right side, i.e., at a position closer to the maintenance port 13 than the purification device supporting portion 22b. Thus, in this embodiment, the right-left direction of the upper slewing body corresponds to "a support-portion arrangement direction along which the purification device supporting portion and the catalyst supporting portion are arranged side-by-side", and the front-rear direction of the upper slewing body corresponds to "a table length direction perpendicular to the support-portion arrangement direction".

The catalyst supporting portion 22a is adapted to support the NOx-reducing catalyst 15 at a position higher than the exhaust-gas-purification device 5 supported by the purification device supporting portion 22, so as to form, just above the hydraulic pump 4, a maintenance space S sufficient to perform maintenance of the hydraulic pump 4, in detail, so as to form, just above the hydraulic pump, a maintenance space S having an upper end at a position higher than an upper end of a space formed just below the purification device supporting portion 22b and the exhaust-gas-purification device 5 supported by the purification device supporting portion 22b. Specifically, the table 22 in this embodiment is provided with a step height between the purification device supporting portion 22b and the catalyst supporting portion 22a to make the catalyst supporting portion 22a higher than the purification device supporting portion 22b. In summary, the table 22 is formed in a stepped shape as a whole.

This table 22 is capable of ensuring a maintenance space S of the hydraulic pump 4 at a position above the hydraulic pump 4, by supporting the NOx-reducing catalyst 15 at a position higher than the exhaust-gas-purification device 5 by one step while supporting the exhaust-gas-purification device 5 at a relatively low position. Thus making the position of the exhaust-gas-purification device 5 low makes it possible, differently from the case where both of the exhaust-gas-purification device 5 and the NOx-reducing catalyst 15 are supported at a high position, as illustrated in FIG. 9B, to eliminate a need for increasing lengths of the flexible exhaust pipe 10 and the support legs 21 to thereby minimize an increase in cost while ensuring good maintainability of the hydraulic pump 4 (particularly, the regulator 4a).

Figure 1:
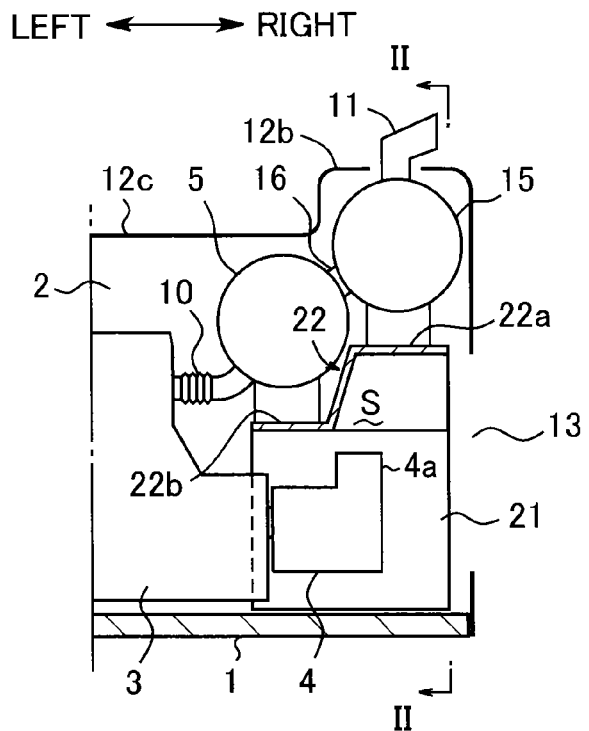
FIG. 1 is a sectional back view illustrating a substantial part of a construction machine according to a first embodiment of the present invention.
Figure 2:
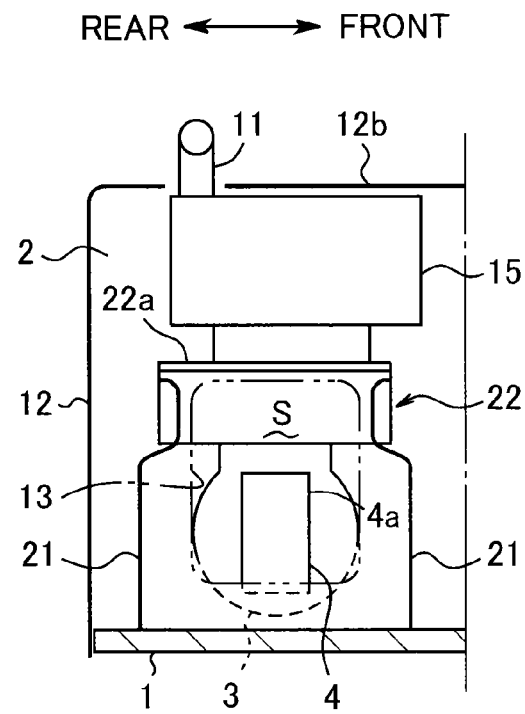
FIG. 2 is a sectional view taken along the line II-II in FIG. 1.

Furthermore, as to the top wall of the guard panel 12, i.e., an upper wall for covering the exhaust-gas-purification device 5 and the NOx-reducing catalyst 15, it is possible to make only a specific portion 12b thereof located just above the NOx-reducing catalyst supported by the catalyst supporting portion locally protrude upwardly to locate a remaining portion 12c other than the specific portion 12b below the specific portion 12b, as illustrated in FIG. 1. This enables visibility of a region just above the remaining portion 12c other than the specific portion 12b, e.g., operator's rearward visibility, to be expanded.

Next will be described details of the support member.

As shown in FIG. 3, the catalyst supporting portion 22a of the table 22 exists only in an intermediate region except for opposite end regions of the table 22 in the front-rear direction of the upper slewing body, i.e., the table length direction, and two region of the table on both sides of the intermediate region are located at a height position equal to that of the purification device supporting portion 22b to make up a pair of front and rear connected portions 22c in cooperation with respective opposite end regions of the purification device supporting portion 22b in the table length direction. The two support legs 21 are connected to the connected portions 22c, respectively, and disposed on both sides of the hydraulic pump 4 in the table length direction (in this embodiment, in the front-rear direction of the upper slewing body), respectively. Thus, in this table 22, each of the connected portions 22c which are the opposite end regions of the table 22 in the table length direction has a constant height in the support-portion arrangement direction along which the purification device supporting portion 22b and the catalyst supporting portion 22a are arranged side-by-side, enabling each of the support legs 21 to be connected to the connected portions 22c, respectively, with a simple structure. This means that the attachment of the support leg 21 to the table 22 can be completely performed in one horizontal plane. This allows assembling efficiency and accuracy to be enhanced.

Both of the support legs 21, 21 are disposed between the table 22 and the upper frame 1 at respective both sides of the table in the table length direction, more accurately, between the table 22 and respective sets of a flat plate-shaped main leg bracket 23 and a flat plate-shaped auxiliary leg bracket 24, the brackets 23 and 24 standing upright on the upper frame 1. Next will be detailed a structure of each of the support legs 21, 21 based on FIGS. 3 to 5.

Each of the support legs 21 is configured to have a main leg 25 adapted to be attached between the table 22 and the bracket 23, and an auxiliary leg 26 adapted to be attached between the main leg 25 and the bracket 24, at a position offset from the main leg 25 in the support-portion arrangement direction, i.e., offset leftward in this embodiment.

The main leg 25 is composed of a single plate and formed to have a lower half portion which has a shape of slightly extending outward in the table length direction, including an upper end portion adapted to be connected to the connected portion 22c of the table 22 through a leg mounting seat 27 and a lower end portion adapted to be detachably connected to the frame 1.

The leg mounting seat 27 is formed in a block shape and fixed to a lower surface of the connected portion 22c. The leg mounting seat 27 has an outer surface in the table length direction, the outer surface forming an upper main-leg joint surface which is a plane extending in an up-down direction and the support-portion arrangement direction (in this embodiment, the right-left direction). On the other hand, the upper end of the main leg 25 has an inner surface forming a table joint surface which is a plane extending in the up-down direction and the support-portion arrangement direction (in this embodiment, the right-left direction). In a state where the table joint surface is superimposed on the upper main-leg joint surface, i.e., the outer surface of the leg mounting seat 27, the upper end of the main leg 25 and the leg mounting seat 27 are detachably connected to each other by a plurality of bolts 28, - - - .

The main leg bracket 23 stands upright from an upper surface of a frame body of the upper frame 1, having an outer surface forming a lower main-leg joint surface which is a plane extending in the up-down direction and the support-portion arrangement direction (in this embodiment, the right-left direction). On the other hand, the lower end of the main leg 25 has an inner surface forming a main leg-side frame joint surface which is a plane extending in the up-down direction and the support-portion arrangement direction. In a state where the main leg-side frame joint surface is superimposed on the lower main-leg joint surface, i.e., the outer surface of the main leg bracket 23, the lower end of the main leg and the main leg bracket 23 are detachably connected to each other by a plurality of fastening devices 29 each consisting of a combination of a bolt and a nut.

The table 22 is thus detachable from the two support legs 21, which enables the exhaust-gas-aftertreatment device (only the exhaust-gas-purification device 5, or both of the exhaust-gas-purification device 5 and the NOx-reducing catalyst 15 additionally provided) to be attached and detached together with the table 22, thus enabling a particularly large-scale maintenance operation such as replacement of the hydraulic pump 4 to be performed with high efficiency.

Furthermore, in this embodiment, each of the lengthwise opposite ends (i.e., front and rear ends) of the table 22 is supported on the upper frame 1 by the two members arranged side-by-side in the support-portion arrangement direction (the right-left direction), namely, the main leg 25 and the auxiliary leg 26, which allows a support state of the table 22, i.e., a support state of the exhaust-gas-aftertreatment device, to be stabilized.

The auxiliary leg 26 comprises a first leg component 30 and a second leg component 31 which are two L-shaped leg components each having vertical and horizontal joint surfaces. Specifically, the first leg component 30 has a main-leg joint surface which is a plane extending in the up-down direction and the support-portion arrangement direction (right-left direction), namely, a vertical surface, and a first joint surface which is a plane extending in the support-portion arrangement direction (right-left direction) and the table length direction (front-rear direction), namely, a horizontal direction. In a state where the main-leg joint surface is superimposed on a vertical inner surface of an intermediate portion of the main leg 25, the first leg component 30 and the main leg 25 are detachably connected to each other by a plurality of fastening devices 33 each consisting of a combination of a bolt and a nut. The second leg component 31 has an auxiliary leg-side frame joint surface which is a plane extending in the up-down direction and the table length direction (front-rear direction), namely, a vertical surface, and a second joint surface which is a plane extending in the support-portion arrangement direction (right-left direction) and the table length direction (front-rear direction), namely, a horizontal direction. In a state where the auxiliary leg-side frame joint surface is superimposed on an auxiliary leg joint surface of the auxiliary leg bracket 24, the second leg component 31 and the auxiliary leg bracket 24 are detachably connected to each other by a plurality of fastening devices 34 each consisting of a combination of a bolt and a nut. Besides, in a state where the first joint surface is superimposed on the second joint surface, the first leg component 30 and the second leg component 31 are detachably connected to each other by a plurality of fastening devices 32 each consisting of a combination of a bolt and a nut.

Each of the joint surfaces is formed with a plurality of bolt insertion holes each being larger than an outer diameter of the bolt for use in the joining. In the state where the joint surfaces corresponding to each other are superimposed together, the plurality of bolts are inserted into respective insertion holes, thereby achieving the connection by a plurality of fastening devices including the bolts. Hence, in each of the connection area, a relative position between two members to be connected can be adjusted in two directions along the superimposed joint surfaces by a distance corresponding to a gap between the bolt and the bolt insertion hole.

Thus, in the support member, the upper end of the main leg 25 is connected to the table 22 so as to allow the position of the upper end of the main leg 25 relative to that of the table 22 to be adjusted in the up-down direction and the right-left direction (support-portion arrangement direction); the first leg component 30 of the auxiliary leg 26 is connected to the main leg 25 so as to allow the position of the first leg component 30 relative to that of the main leg 25 to be adjusted in the up-down direction and the right-left direction (support-portion arrangement direction); the second leg component 31 is connected to the first leg component 30 so as to allow the position of the second leg component 31 relative to that of the first leg component 30 to be adjusted in the front-rear direction (table length direction) and the right-left direction (support-portion arrangement direction); the lower end of the main leg 25 is connected to the main leg bracket 23 standing upright on the upper frame 1 so as to allow the position of the lower end of the main leg 25 relative to the main leg bracket to be adjusted in the up-down direction and the right-left direction (support-portion arrangement direction); a lower end of the second leg component 31 of the auxiliary leg 26 is connected to the auxiliary leg bracket 24 so as to allow the position of the lower end of the second leg component 31 relative to that of the auxiliary leg bracket 24 to be adjusted in the up-down direction and the front-rear direction (table length direction). These connections enable dimensional errors, in the up-down, front-rear and right-left directions, between the table 22 and each of the support legs 21 and between each of the support legs 21 and the upper frame 1 (each of the brackets 23, 24) to be absorbed, thus facilitating assembling.

Figure 6:
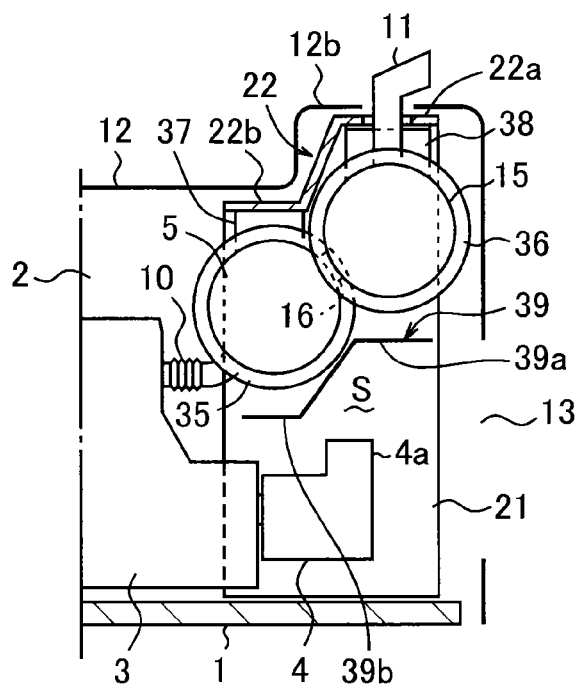
FIG. 6 is a sectional back view illustrating a substantial part of a construction machine according to a second embodiment of the present invention.

Next will be described the second embodiment of the present invention with reference to FIG. 6.

While, in the first embodiment, the exhaust-gas-purification device 5 and the NOx-reducing catalyst 15 are placed on the table 22 of the support member, the exhaust-gas-purification device 5 and the NOx-reducing catalyst 15, in the second embodiment, are hung down from a table 22 at different height positions. Specifically, each of a pair of support legs 21 in the second embodiment is longer in the up-down direction than that in the first embodiment, having such a size that an upper end thereof is located adjacent to a top wall of a guard panel 12. As with the first embodiment, the table 22 has a purification device supporting portion 22b and a catalyst supporting portion 22a, between which a step height is provided so as to make the catalyst supporting portion 22a be higher than the purification device supporting portion 22b. Each of the exhaust-gas-purification device 5 and the NOx-reducing catalyst 15 has a flange 35, 36 protruding outwardly beyond an outer peripheral surface thereof. The flange 35 and the flange 36 are connected to a lower surface of the purification device supporting portion 22b and a lower surface of the catalyst supporting portion 22a through a bracket 37 and a bracket 38, respectively.

In the second embodiment, provided is a fire-protecting partition wall 39 between a set of the exhaust-gas-purification device 5 and the NOx-reducing catalyst 15, and a hydraulic pump 4. The partition wall 39 is also provided with a step height corresponding to the step height of the table 22, so that a portion 39a of the partition wall 39 located just below the catalyst supporting portion 22a is located at a position higher than a portion 39b of the partition wall 39 located just below the exhaust-gas-purification device 5.

Also in the second embodiment, between the portion 39a located just below the catalyst supporting portion 22a and the hydraulic pump 4a is formed a maintenance space S for the hydraulic pump 4. An upper end of the maintenance space S (in the second embodiment, a lower surface of the portion 39b of the partition wall 39 located just below the NOx-reducing catalyst 15) is positioned higher than an upper end of a space just below the exhaust-gas-purification device 5 by a difference in height position between the exhaust-gas-purification device 5 and the NOx-reducing catalyst 15. Hence, as with the first embodiment, it is possible to secure large maintenance space S while keeping the position of the exhaust-gas-purification device 5 low.

The above embodiments of the present invention may be changed or modified as follows.

(1) In the present invention, the support leg may be composed only of a main leg. Also in this case, the main leg may be composed of a plurality of leg components having two mutually orthogonal joint surfaces, which allows the degrees of freedom in the same directions to be secured as those in the above embodiments. However, the function of ensuring such degrees of freedom, i.e., a relative position adjusting function, is not essential for the present invention. One or more of the degrees of freedom in the up-down, front-rear and right-left directions may be provided according to need, or the number of degrees of freedom may be zero, i.e., the position adjusting function may be completely eliminated.

(2) The catalyst supporting portion 22a of the table 22, while being provided only in the intermediate region in the table length direction in the first embodiment, may be provided over the entire region in the table length direction. In this case, it is preferable that the support leg 21 includes a portion for supporting at least the catalyst supporting portion 22a.

(3) The table 22 constituting the support member is not limited to a plate-shaped member, but may be formed as a frame-shaped body based on a combination of a plurality of beam members. Besides, each of the table 22 and the support leg 21 may be divided into a portion for supporting the exhaust-gas-purification device 5 and a portion for supporting the NOx-reducing catalyst 15.

(4) While the engine 3, in the above embodiments, is provided in the engine room 2 to extend in the right-left direction, the hydraulic pump 4 being provided on the right side of the engine 3, the exhaust-gas-aftertreatment device being installed across and above the hydraulic pump 4 in the front-rear direction, the arrangement is not limited to such specific directions, but may be appropriately changed depending on actual situations in terms of space. In summary, the support-portion arrangement direction and/or the table length direction according to the present invention may be freely selected.

(5) The present invention is not limited to hydraulic excavator but can be widely applied to various types of construction machines having an exhaust-gas-aftertreatment device provided on a frame thereof similarly to the above embodiments.

As described above, the present invention provides a construction machine capable of ensuring a maintenance space above a hydraulic pump while allowing a NOx-reducing catalyst to be installed, not involving significant increase in cost. This construction machine comprises: a frame; an engine installed on the frame; a hydraulic pump installed on the frame in side-by-side relation with the engine along an axial direction of the engine to be driven by the engine; a guard panel disposed on the frame so as to surround an engine room in which the engine and the hydraulic pump is accommodated, the guard panel having a maintenance port which is an opening for allowing maintenance of the hydraulic pump to be performed from the outside; an exhaust-gas-purification device provided in the engine room and connected to the engine via an exhaust pipe to remove particulate matter contained in exhaust gas from the engine; and a support member adapted to support an exhaust-gas-aftertreatment device including the exhaust-gas-purification device, inside the engine room at a position just above the hydraulic pump, wherein the support member has: a purification device supporting portion to support the exhaust-gas-purification device; and a catalyst supporting portion to support, at a position closer to the maintenance port than the exhaust-gas-purification device, a NOx-reducing catalyst which is equipment to be additionally included in the gas aftertreatment device so as to reduce NOx contained in the exhaust gas, the catalyst supporting portion being adapted to support the NOx-reducing catalyst at a position higher than the exhaust-gas-purification device supported by the purification device supporting portion, so as to form, just above the hydraulic pump, a maintenance space having an upper end at a position higher than an upper end of a space formed just below the purification device supporting portion and the exhaust-gas-purification device supported by the purification device supporting portion.

The support member in the construction machine of the present invention can support the exhaust-gas-purification device as regular equipment, at a relatively low position by the purification device supporting portion, to avoid an increase in length of an exhaust pipe for connecting the exhaust-gas-purification device and the engine, and support the NOx-reducing catalyst by the catalyst supporting portion, in such a manner as to form, just above the hydraulic pump, a maintenance space having an upper end at a position higher than an upper end of a space formed just below the purification device supporting portion and the exhaust-gas-purification device supported by the purification device supporting portion, thereby enabling maintenance of the hydraulic pump to be performed from thereabove.

Besides, thus supporting the exhaust-gas-purification device and the exhaust-gas-aftertreatment device, when the guard panel has a top wall for covering the exhaust-gas-purification device and the NOx-reducing catalyst, makes it possible to make only a specific portion of the top wall, the portion located just above the NOx-reducing catalyst supported by the catalyst supporting portion, locally protrude upward while locating a remaining portion other than the specific portion below the specific portion. This allows visibility of a region just above the remaining portion other than the specific portion, e.g., operator's rearward visibility, to be expanded.

In the present invention, it is preferable that the support member includes: a table having the purification device supporting portion and the catalyst supporting portion; and a plurality of support legs supporting the table at a position just above the hydraulic pump, wherein the purification device supporting portion and the catalyst supporting portion of the table are configured to support the exhaust-gas-purification device and the NOx-reducing catalyst, respectively, and a step height is provided between the purification device supporting portion and the catalyst supporting portion to make the catalyst supporting portion be higher than the purification device supporting portion. This support member makes it possible to ensure the maintenance space above the hydraulic pump while keeping the position of the exhaust-gas-purification device low, with a simple and compact structure including the table provided with the step height.

In this case, it is more preferable that the purification device supporting portion is adapted to receive the exhaust-gas-purification device placed on the purification device supporting portion and the catalyst supporting portion is adapted to receive the NOx-reducing catalyst placed on the catalyst supporting portion, wherein the maintenance space is formed between the catalyst supporting portion and the hydraulic pump. The table in this case can also serve as a partition wall interposed between the hydraulic pump and the set of the exhaust-gas-purification device and the NOx-reducing catalyst, and facilitate installation of the exhaust-gas-purification device and the NOx-reducing catalyst.

More preferably, the catalyst supporting portion exists only in an intermediate region in a table length direction perpendicular to a support-portion arrangement direction along which the purification device supporting portion and the catalyst supporting portion are arranged side-by-side and respective regions of the table on both sides of the catalyst supporting portion are located at respective height positions equal to that of the purification device supporting portion to make up respective connected portions in cooperation with opposite end regions of the purification device supporting portion in the table length direction, respectively, and the support legs are connected to the respective connected portions and disposed on both sides of the hydraulic pump in the table length direction, respectively. In this table, each of the connected portions which are the opposite end regions of the table in the table length direction has a constant height in the direction of the arrangement of the catalyst supporting portion and the support-portion arrangement, thereby allowing the support legs to be connected to respective connected portions with a simple structure. Besides, assembling efficiency and accuracy can be enhanced.

Preferably, the table is detachably connected to each of the support legs. This connection enables only the exhaust-gas-purification device or both of the exhaust-gas-purification device and the NOx-reducing catalyst to be attached to and detached from the support legs together with the table, while leaving the support legs on the side of the frame. This provides enhanced efficiency, particularly, of a large-scale maintenance operation, such as replacement of the hydraulic pump.

In the case of comprising the support legs disposed on both sides of the table in the table length direction, respectively, it is preferable that each of the support legs includes a main leg disposed between the table and the frame and an auxiliary leg disposed offset from the main leg in the support-portion arrangement direction to interconnect the main leg and the frame. These support legs, where the main legs support the table on both sides of the table in the table length direction while the auxiliary legs support respective main legs at respective positions offset in the table length direction and the support-portion arrangement direction perpendicular to the table length direction, allows the table and the exhaust-gas-aftertreatment device placed on the table to be stably supported on the frame in the two mutually orthogonal directions.

In this case, it is preferable that: the main leg has an upper end connected to the table so as to allow the position of the upper end relative to the position of the table to be adjusted in an up-down direction and the support-portion arrangement direction and a lower end connected to the frame so as to allow the position of the lower end relative to the position of the frame to be adjusted in the up-down direction and the support-portion arrangement direction; and the auxiliary leg includes a first leg component connected to the main leg so as to allow the position of the first leg component relative to the position of the main leg to be adjusted in the up-down direction and the support-portion arrangement direction and a second leg component connected to the frame so as to allow the position of the second leg component relative to the position of the frame to be adjusted in the up-down direction and the table length direction, the first leg component and the second leg component being interconnected so as to allow the respective positions of the first and second leg components relative to each other to be adjusted in the support-portion arrangement direction and the table length direction. This combination of the main leg and the auxiliary leg can absorb dimension errors in the up-down, front-rear and right-left directions between the table and each of the support legs and between each of the support legs and the frame, thereby facilitating assembling.

More specifically, it is preferable that: the table has an upper main-leg joint surface provided for each of the main legs, the upper main-leg joint surface being a plane extending in the up-down direction and the support-portion arrangement direction; the frame has a lower main-leg joint surface provided for each of the main legs, the lower main-leg joint surface being a plane extending in the up-down direction and the support-portion arrangement direction, and an auxiliary-leg joint surface provided for each of the auxiliary legs, the auxiliary-leg joint surface being a plane extending in the up-down direction and the table length direction; the upper end of the main leg has a table joint surface which is a plane extending in the up-down direction and the support-portion arrangement direction and is detachably joined to the upper main-leg joint surface of the table; the lower end of the main leg has a main leg-side frame joint surface which is a plane extending in the up-down direction and the support-portion arrangement direction and is detachably joined to the lower main-leg joint surface; the first leg component of the auxiliary leg has a main-leg joint surface which is a plane extending in the up-down direction and the support-portion arrangement direction and detachably joined to the main leg and a first joint surface which is a plane extending in the support-portion arrangement direction and the table length direction; and the second leg component of the auxiliary leg has an auxiliary leg-side frame joint surface which is a plane extending in the up-down direction and the table length direction and detachably joined to the auxiliary-leg joint surface and a second joint surface which is a plane extending in the support-portion arrangement direction and the table length direction and detachably joined to the first joint surface.

In this case, the frame preferably comprises, for example, a main leg bracket standing upright so as to have the lower main-leg joint surface, and an auxiliary leg bracket standing upright so as to have the auxiliary-leg joint surface.

What is claimed is:

1. A construction machine comprising:
   a frame;
   an engine installed on the frame;
   a hydraulic pump installed on the frame in side-by-side relation with the engine along an axial direction of the engine to be driven by the engine;
   a guard panel disposed on the frame so as to surround an engine room in which the engine and the hydraulic pump is accommodated, the guard panel having a maintenance port which is an opening for allowing maintenance of the hydraulic pump to be performed from the outside;
   an exhaust-gas-purification device provided in the engine room and connected to the engine via an exhaust pipe to remove particulate matter contained in exhaust gas from the engine; and
   a support member adapted to support an exhaust-gas-aftertreatment device including the exhaust-gas-purification device, inside the engine room at a position just above the hydraulic pump, the support member including: a purification device supporting portion to support the exhaust-gas-purification device; and a catalyst supporting portion to support, at a position closer to the maintenance port than the exhaust-gas-purification device, a NOx-reducing catalyst which is equipment to be additionally included in the gas aftertreatment device so as to reduce NOx contained in the exhaust gas, the catalyst supporting portion being adapted to support the NOx-reducing catalyst at a position higher than the exhaust-gas-purification device supported by the purification device supporting portion, so as to form, just above the hydraulic pump, a maintenance space having an upper end at a position higher than an upper end of a space formed just below the purification device supporting portion and the exhaust-gas-purification device supported by the purification device supporting portion.

2. The construction machine as defined in claim 1, wherein the guard panel has a top wall for covering the exhaust-gas-purification device and the NOx-reducing catalyst, the top wall being configured such that only a specific portion of the top wall, the specific portion located just above the NOx-reducing catalyst supported by the catalyst supporting portion, locally protrudes upwardly, while a remaining portion other than the specific portion is located below the specific portion.

3. The construction machine as defined in claim 1, wherein the support member includes: a table having the purification device supporting portion and the catalyst supporting portion; and a plurality of support legs supporting the table at a position just above the hydraulic pump, wherein the purification device supporting portion and the catalyst supporting portion of the table are configured to support the exhaust-gas-purification device and the NOx-reducing catalyst, respectively, and a step height is provided between the purification device supporting portion and the catalyst supporting portion to make the catalyst supporting portion be higher than the purification device supporting portion.

4. The construction machine as defined in claim 3, wherein the purification device supporting portion is adapted to receive the exhaust-gas-purification device placed on the purification device supporting portion and the catalyst supporting portion is adapted to receive the NOx-reducing catalyst placed on the catalyst supporting portion, wherein the maintenance space is formed between the catalyst supporting portion and the hydraulic pump.

5. The construction machine as defined in claim 3, wherein the table is detachably connected to each of the support legs.

6. The construction machine as defined in claim 3, wherein: the catalyst supporting portion is formed in an intermediate region in a table length direction perpendicular to a support-portion arrangement direction along which the purification device supporting portion and the catalyst supporting portion are arranged side-by-side; respective regions of the table on both sides of the catalyst supporting portion are located at respective height positions equal to that of the purification device supporting portion to make up a connected portion in cooperation with opposite end regions of the purification device supporting portion in the table length direction, respectively; and the support legs are connected to the respective connected portions and disposed on both sides of the hydraulic pump in the table length direction, respectively.

7. The construction machine as defined in claim 3, wherein the support legs are disposed on both sides of the table in the table length direction, respectively, each of the support legs including a main leg disposed between the table and the frame and an auxiliary leg disposed at a position offset from the main leg in the support-portion arrangement direction to interconnect the main leg and the frame.

8. The construction machine as defined in claim 7, wherein: the main leg has an upper end connected to the table so as to allow the position of the upper end relative to the position of the table to be adjusted in an up-down direction and the support-portion arrangement direction and a lower end connected to the frame so as to allow the position of the lower end relative to the position of the frame to be adjusted in the up-down direction and the support-portion arrangement direction; and the auxiliary leg includes a first leg component connected to the main leg so as to allow the position of the first leg component relative to the position of the main leg to be adjusted in the up-down direction and the support-portion arrangement direction and a second leg component connected to the frame so as to allow the position of the second leg component relative to the position of the frame to be adjusted in the up-down direction and the table length direction, the first leg component and the second leg component being interconnected so as to allow the respective positions of the first and second leg components relative to each other to be adjusted in the support-portion arrangement direction and the table length direction.

9. The construction machine as defined in claim 8, wherein: the table has an upper main-leg joint surface provided for each of the main legs, the upper main-leg joint surface being a plane extending in the up-down direction and the support-portion arrangement direction; the frame has a lower main-leg joint surface provided for each of the main legs, the lower main-leg joint surface being a plane extending in the up-down direction and the support-portion arrangement direction, and an auxiliary-leg joint surface provided for each of the auxiliary legs, the auxiliary-leg joint surface being a plane extending in the up-down direction and the table length direction; the upper end of the main leg has a table joint surface which is a plane extending in the up-down direction and the support-portion arrangement direction and is detachably joined to the upper main-leg joint surface of the table; the lower end of the main leg has a main leg-side frame joint surface which is a plane extending in the up-down direction and the support-portion arrangement direction and is detachably joined to the lower main-leg joint surface; the first leg component of the auxiliary leg has a main-leg joint surface which is a plane extending in the up-down direction and the support-portion arrangement direction and detachably joined to the main leg and a first joint surface which is a plane extending in the support-portion arrangement direction and the table length direction; and the second leg component of the auxiliary leg has an auxiliary leg-side frame joint surface which is a plane extending in the up-down direction and the table length direction and detachably joined to the auxiliary-leg joint surface and a second joint surface which is a plane extending in the support-portion arrangement direction and the table length direction and detachably joined to the first joint surface.

10. The construction machine as defined in claim 9, wherein the frame includes a main leg bracket standing upright to have the lower main-leg joint surface and an auxiliary leg bracket standing upright to have the auxiliary-leg joint surface.

* * * * *